(12) United States Patent
Yuhara et al.

(10) Patent No.: US 8,845,839 B2
(45) Date of Patent: Sep. 30, 2014

(54) LAMINATION APPARATUS AND LAMINATION METHOD

(75) Inventors: Hiroshi Yuhara, Yokohama (JP); Manabu Yamashita, Kyoto (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/009,953

(22) PCT Filed: Apr. 6, 2012

(86) PCT No.: PCT/JP2012/059497
§ 371 (c)(1),
(2), (4) Date: Oct. 4, 2013

(87) PCT Pub. No.: WO2012/137918
PCT Pub. Date: Oct. 11, 2012

(65) Prior Publication Data
US 2014/0027067 A1    Jan. 30, 2014

(30) Foreign Application Priority Data
Apr. 7, 2011    (JP) ................................ 2011-085790

(51) Int. Cl.
*B32B 37/00*    (2006.01)
(52) U.S. Cl.
USPC ................. 156/228; 156/580; 100/258 A
(58) Field of Classification Search
CPC .......... H01M 10/0404; B32B 37/0046; B65H 29/241; B65H 31/10
USPC ........... 156/228, 580, 581, 583.1; 100/258 R, 100/258 A
See application file for complete search history.

(56) References Cited

U.S. PATENT DOCUMENTS

| | | | | |
|---|---|---|---|---|
| 5,480,508 A | * | 1/1996 | Manabe et al. | 156/353 |
| 6,234,225 B1 | * | 5/2001 | Tanaka et al. | 156/390 |
| 6,922,229 B2 | * | 7/2005 | Yawata et al. | 349/187 |
| 7,291,422 B2 | * | 11/2007 | Oogami et al. | 429/152 |

FOREIGN PATENT DOCUMENTS

| | | |
|---|---|---|
| JP | 63-78457 A | 4/1988 |
| JP | 3380935 B2 | 12/2002 |
| JP | 2009-32544 A | 2/2009 |
| JP | 2009-206046 A | 9/2009 |
| JP | 2010-212018 A | 9/2010 |

OTHER PUBLICATIONS

Chinese Office Action dated Jun. 25, 2014, (7 pgs.).

* cited by examiner

*Primary Examiner* — James Sells
(74) *Attorney, Agent, or Firm* — Foley & Lardner LLP

(57) ABSTRACT

A lamination, apparatus laminates sheet members including at least one of an electrode and a separator. The lamination apparatus includes a table on which the sheet members are laminated, a clamper that presses an assembled laminate of the sheet members laminated on the table; a clamper drive unit that horizontally-rotates and vertically-moves the clamper, a level adjuster that moves the table downward relative to the clamper according to a lamination progress of the sheet members. After a new sheet member is laminated on the assembled laminate pressed downward by the clamper, the clamper drive unit lifts up the clamper above the new sheet member while rotating the clamper and then moves the clamper downward to press the new sheet member from above. The level adjuster moves the table downward by a stroke corresponding to thickness of the number of laminated sheets of the sheet members included in the assembled laminate.

9 Claims, 13 Drawing Sheets (A)

(B)

LAMINATION APPARATUS AND LAMINATION METHOD

TECHNICAL FIELD

The present invention relates to a lamination apparatus and a lamination method for laminating sheet materials including at least one of an electrode and a separator.

BACKGROUND ART

Recently, in the context of growing movement for environmental protection, developments of an electric vehicle (EV) and a hybrid electric vehicle (HEV) are advanced. A repeatedly-chargeable lithium-ion secondary battery draws attention as a power source for driving a motor of them.

A lithium-ion secondary battery cell is configured by stacking plural unit cells in which a separator impregnated with electrolyte is interposed between a cathode electrode and an anode electrode, and electrodes (cathode electrodes/anode electrodes) and separators are sequentially laminated in its manufacturing process.

A Patent Literature 1 listed below discloses a sheet lamination apparatus that prevents position aberration when laminating electrodes and separators. In the sheet lamination apparatus, while pressing edges of an assembled laminate composed of electrodes and separators downward by clampers, an electrodes or a separator is sequentially laminated upon the assembled laminate by a suction hand. When a new sheet member (e.g. a separator) has been laminated by the suction hand on the assembled laminate pressed downward by the clampers, the clampers are once evacuated above the new sheet member and then moved downward to press the new sheet member downward. The clampers are configures to be lifted up to a constant height level consistently. The height level is set to a constant value larger than final thickness of the assembled laminate (completed thickness) in consideration of thickness (height) increase of the assembled laminate along with progress of a lamination process.

CITATION LIST

Patent Literature

Patent Literature 1: Japanese Patent Unexamined Publication No. 2009-206046 (paragraph [0027])

SUMMARY OF INVENTION

However, in the sheet lamination apparatus, when a new sheet member is laminated in a state where the assembled laminate is thin at an early stage of the lamination process, the clampers are moved extremely upward. Therefore, the edges of the new sheet member are lifted upward by the clampers moved extremely upward, and then, may be temporally curled up excessively.

Therefore, an object of the present invention is to provide a lamination apparatus and a lamination method that can laminate sheet members without making them extremely deformed when laminating the sheet members.

A first aspect of the present invention provides a lamination apparatus for laminating sheet members including at least one of an electrode and a separator, the apparatus comprising: a table on which the sheet members are laminated; a clamper (holding means) that presses an assembled laminate of the sheet members laminated on the table; a clamper (drive means for the holding means) drive unit that horizontally rotates and vertically moves the clamper; and a level adjuster (level adjusting means) that moves the table downward relative to the clamper according to a lamination progress of the sheet members, wherein, when a new sheet member is laminated on the assembled laminate that is pressed downward by the clamper, the clamper drive unit lifts up the clamper above the new sheet member while rotating the clamper and then moves the clamper downward to press the new sheet member from above, and the level adjuster moves the table downward by a stroke length corresponding to thickness of the number of laminated sheets of the sheet members included in the assembled laminate.

A second aspect of fee present invention provides a lamination method for laminating sheet members including at least one of an electrode and a separator, the method comprising: laminating a new sheet member on an assembled laminate of the sheet members that are laminated on a table and pressed by a clamper from above, pressing the new sheet member from above by lifting up the clamper above the new sheet member while rotating the clamper and then moving the clamper downward, and moving the table downward relative to the clamper by a stroke length corresponding to thickness of the number of laminated sheets of the sheet members laminated on the table.

DESCRIPTION OF EMBODIMENTS

Figure 1:
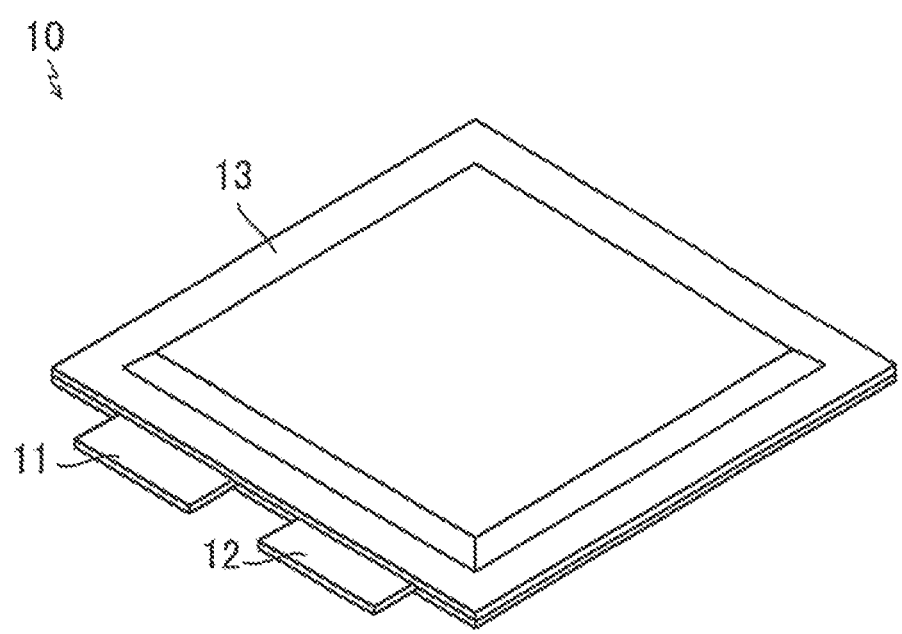
FIG. 1 It is a perspective view showing an appearance of a lithium-ion secondary battery cell manufactured by a lamination apparatus according to an embodiment.

Hereinafter, an embodiment of a lamination apparatus (lamination method) will be explained with reference to tire drawings. Note that proportions in the drawings are emphasized for convenience of explanations, so that they may be different from actual proportions.

Figure 2:
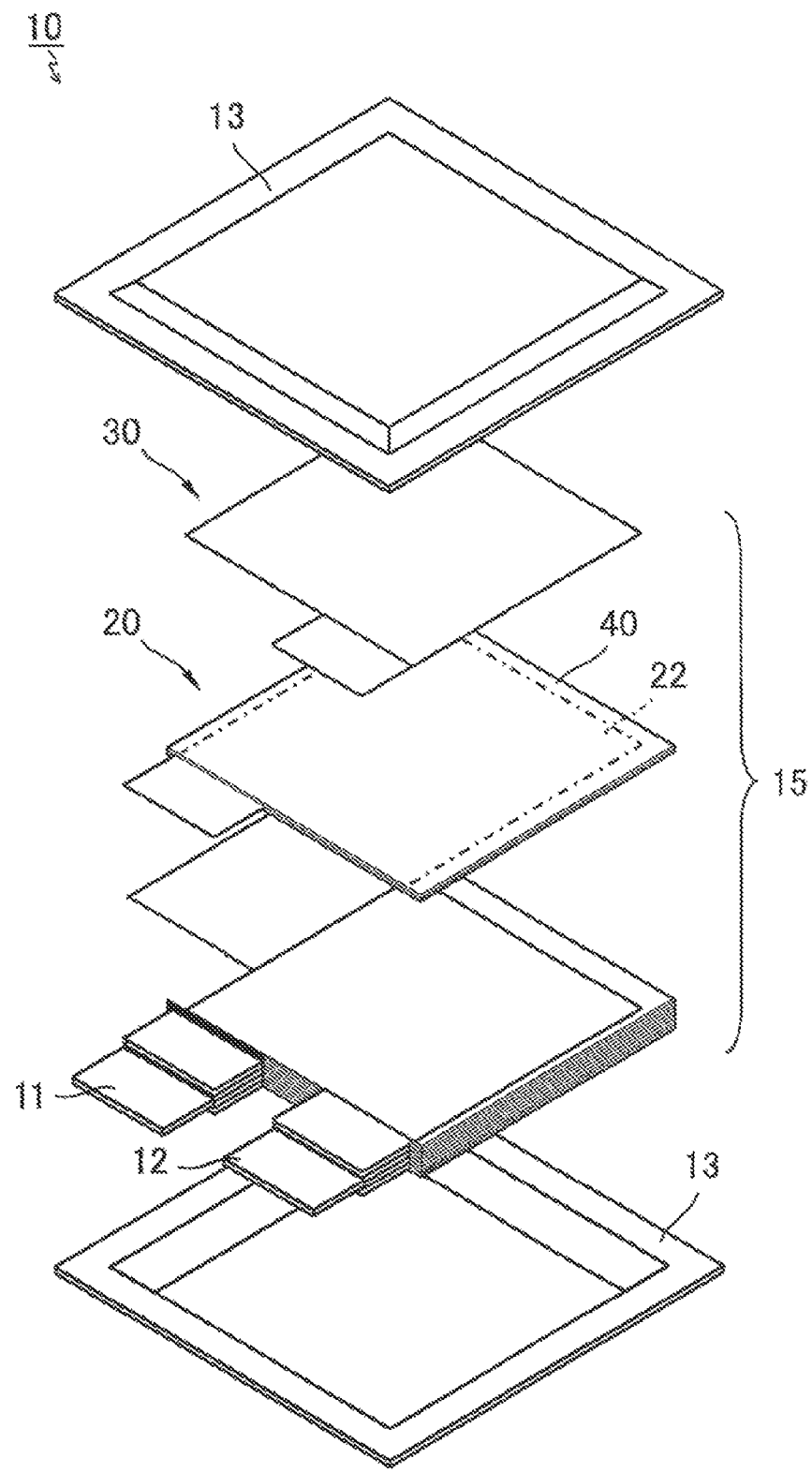
FIG. 2 It is an exploded perspective view of the lithium-ion secondary battery.

FIG. 1 and FIG. 2 show a laminated lithium-ion secondary battery cell 10 manufactured by a sheet lamination apparatus according to the present embodiment.

As shown in FIG. 1, the cell 10 has a rectangular flat shape. A cathode lead 11 and an anode lead 12 are extended out from an edge of an outer jacket 13 of the cell 10. A power-generation element (battery element: assembled laminate) 15 in which charge and discharge reactions occur is packaged in the outer jacket 13.

As shown in FIG. 2, the power-generation element 15 is configured by laminating packed cathode electrodes (sheet materials) 20 and anode electrodes (sheet materials) 30 alternately. The packed cathode electrode 20 is configured by sandwiching, between two sheets of separators 40, a cathode electrode 22 configured by forming cathode active material layers on both sides of a sheet-shaped cathode current collector. The two sheets of separators 40 are sealed to each other at their edges to form an envelope shape. The anode electrode 30 is configured by forming anode active material layers on both sides of a sheet-shaped anode current collector. Note that, since a method itself for manufacturing the cell 10 by alternately laminating the packed cathode electrodes 20 and the anode electrodes 30 is a common method for manufacturing a lithium-ion secondary battery module, its detailed explanations are omitted.

Next, the sheet lamination apparatus for assembling the above-explained power-generation element 15 will be explained.

Figure 3:
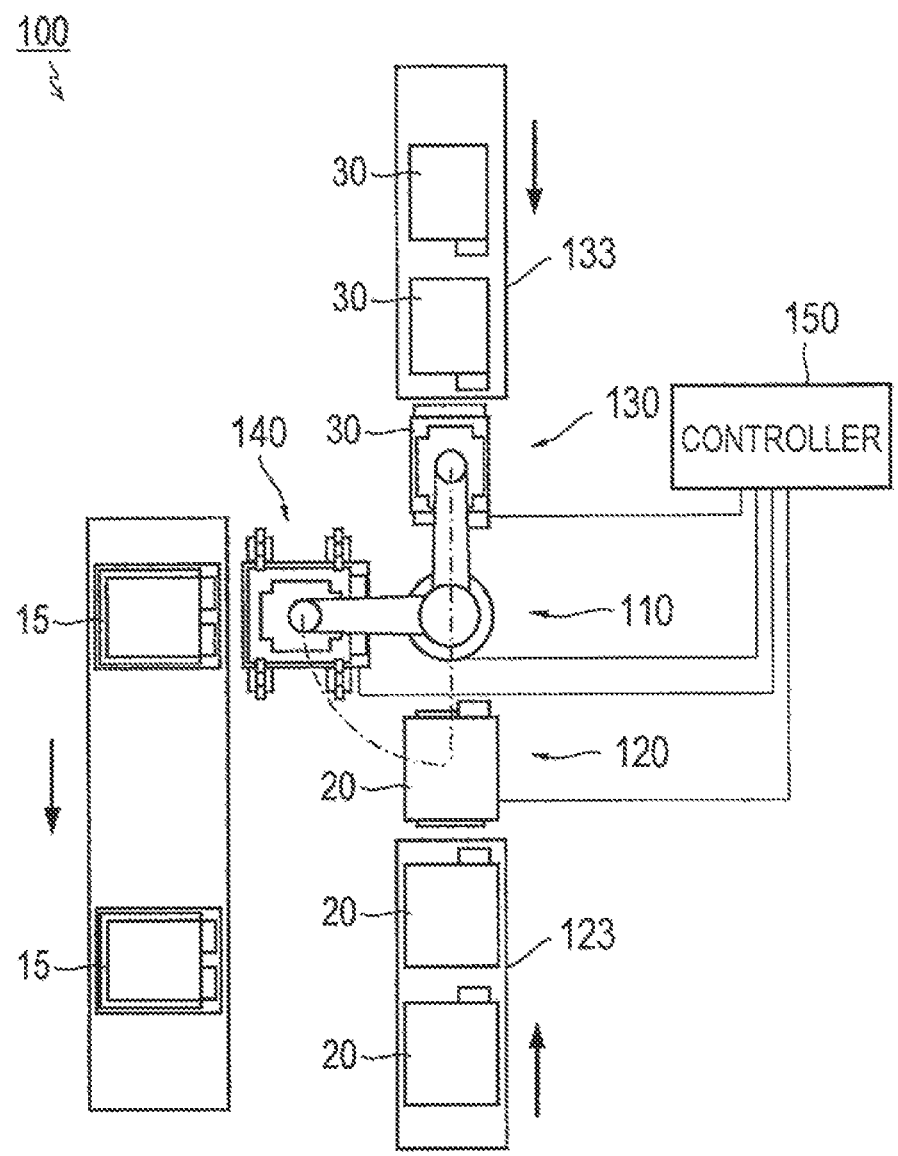
FIG. 3 It is a plan view of the sheet lamination apparatus.

As shown in FIG. 3, the sheet lamination apparatus 100 includes a lamination robot 110, a cathode electrode supply unit 120, an anode electrode supply unit 130, a laminating unit 140, and a controller 150. The cathode electrode supply unit 120 and the anode electrode supply unit 130 are disposed at opposite positions so as to interpose the lamination robot 110 in the center of them. The laminating unit 140 is disposed at a position at 90 degrees to an axial line connecting the cathode electrode supply unit 120 with the anode electrode supply unit 130. The lamination robot 110, the cathode electrode supply unit 120, the anode electrode supply unit 130, and the laminating unit 140 are controlled by the controller 150.

Figure 4:
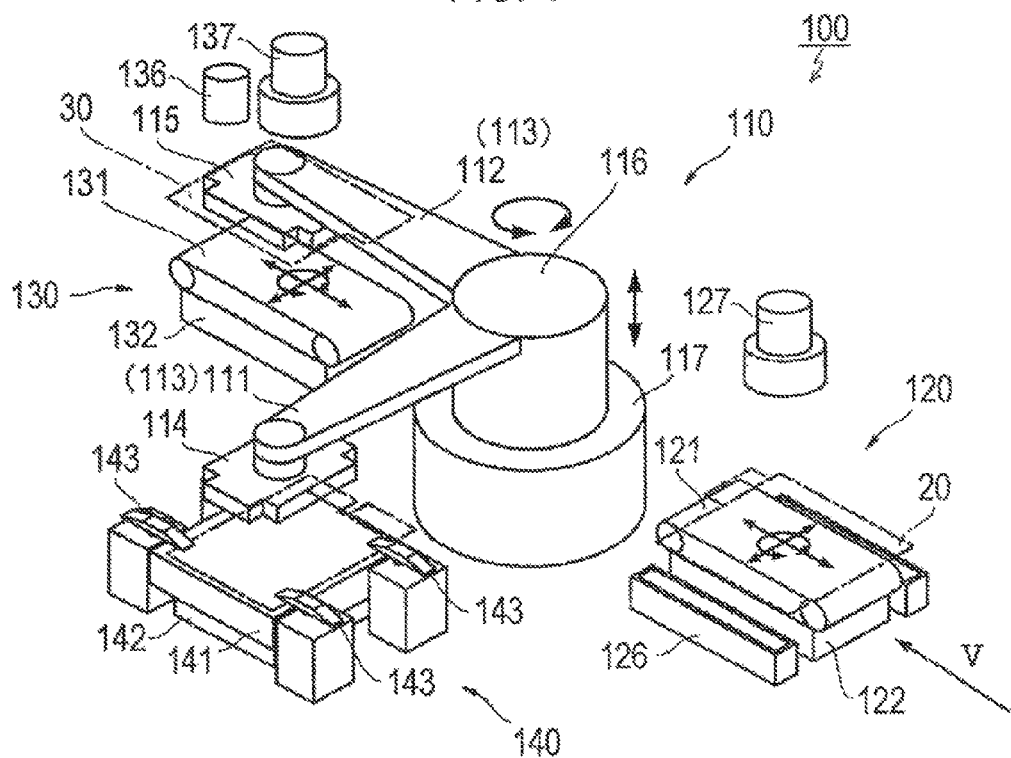
FIG. 4 It is a perspective view of the sheet lamination apparatus.

The lamination robot 110 forms the assembled laminate 15 by laminating the packed cathode electrodes 20 and the anode electrodes 30 alternately. As shown in FIG. 4, the lamination robot 110 includes an L-shaped arm unit 113 composed of a first arm 111 and a second arm 112, a first suction hand 114 provided at an end of the first arm 111, and a second suction hand 115 provided at an end of the second arm 112. The first arm 111 and the second arm 112 are extended, respectively, along directions that form a 90-degree angle therebetween about a drive shaft 116. The arm unit 113 swings horizontally when the drive shaft 116 is rotationally driven by an arm drive unit 117. In addition, the arm unit 113 moves vertically when the drive shaft 116 is vertically driven. The first suction hand 114 can hold the packed cathode electrode 20 by suctioning it, and can release the suctioned, packed cathode electrode 20. The second suction hand 115 can hold the anode electrode 30 by suctioning it and can release the suctioned anode electrode 30.

The first suction hand 114 moves back and forth between the cathode electrode supply unit 120 and the laminating unit 140 by swinging of the arm unit 113. Similarly, the second suction hand 115 moves back and forth between the laminating unit 140 and the anode electrode supply unit 130 by swinging of the arm unit 113. Namely, a first state (see FIG. 11) where the first suction hand 114 is located over the cathode electrode supply unit 120 and the second suction hand 115 is located over the laminating unit 140, and a second state (see FIG. 10) where the first suction hand 114 is located over the laminating unit 140 and the second suction hand 115 is located over the anode electrode supply unit 130 are changed over by swinging of the arm unit 113. In addition, the first suction hand 114 is moved downward toward the cathode electrode supply unit 120 (or the laminating unit 140), or moved upward to be separated From the cathode electrode supply unit 120 (or the laminating unit 140) by upward/downward moving of the arm unit 113. Similarly, the second suction hand 115 is moved downward toward the anode electrode supply unit 130 (or the laminating unit 140), or moved upward to be separated from the anode electrode supply unit 130 by upward/downward moving of the arm unit 113 (or the laminating unit 140).

The cathode electrode supply unit 120 supplies the packed cathode electrodes 20. The cathode electrode supply unit 120 includes a cathode electrode supply table 121 on which the packed cathode electrode 20 is laid, and a table drive unit 122 for horizontally shifting or rotating the cathode electrode supply table 121. The packed cathode electrode 20 that has been made in a previous process and then fed by a suction conveyor 123 is laid on the cathode electrode supply table 121 sheet by sheet. The cathode electrode supply table 121 is also a suction conveyor. The cathode electrode supply table 121 suctions the packed cathode electrode 20 after suctioning by the suction conveyor 123 is stopped, and then conveys the packed cathode electrode 20 almost as it is to its center to hold it by negative pressure. In addition, suctioning of the cathode electrode supply table 121 is made stopped when the packed cathode electrode 20 is suctioned by the first suction hand 114. The table drive unit 122 horizontally shifts or rotates the cathode electrode supply table 121 to change a position of the packed cathode electrode 20 on the cathode electrode supply table 121. The table drive unit 122 has three motors for horizontally shifting or rotating the cathode electrode supply table 121 (one motor for rotating, and two motors for horizontally shifting along two directions intersecting perpendicularly to each another: see arrows on the cathode electrode supply table 121 shown in FIG. 4).

Figure 5:
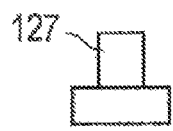
FIG. 5 It is a front view of a cathode electrode supply unit in the sheet lamination apparatus viewed from a direction of an arrow V shown in FIG. 4.
Figure 5:
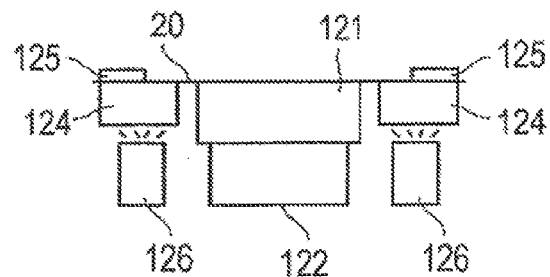
Figure 6:
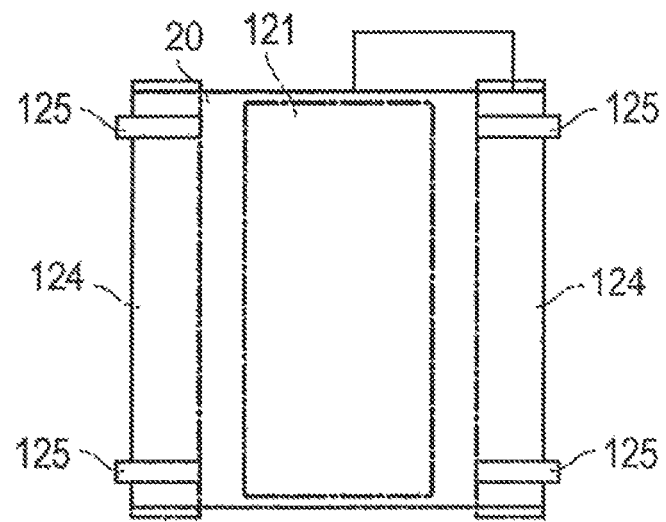
FIG. 6 It is a front view of the cathode electrode supply unit.

The cathode electrode supply table 121 has a width narrower than that of the suction conveyor 123, and is configured to protrude both edges of the packed, cathode electrode 20 from both, edges of the of the cathode electrode supply table 121. As shown in FIG. 5 and FIG. 6, transparent support beds 124 are disposed on both sides of the cathode electrode supply table 121. The support beds 124 support the both edges of the packed cathode electrode 20 protruded from the cathode electrode supply table 121, respectively. In addition, clampers (holding means) 125 are disposed at positions associated with the support beds 124. Both the support beds 124 and the clampers 125 are movable, and, when the packed cathode electrode 20 is laid on the cathode electrode supply table 121, moved closer to the packed cathode electrode 20 to hold the both edges of the packed cathode electrode 20.

In addition, as shows in FIG. 4 and FIG. 5, light sources 126 are provided below the cathode electrode supply table 121, respectively, and cameras 127 are provided above the cathode electrode supply table 121, respectively. The light sources 126 are located under the transparent support beds 124, respectively, and emit lights toward the both edges of the packed cathode electrode 20, respectively. Each of the light sources 126 emits light of wavelength that can be transmitted through the separator 40 by a larger transmittance than a predefined transmittance but cannot be transmitted through the cathode electrode 22 (reflected or absorbed). The cameras 127 take images of the packed cathode electrode 20 from above and then output image data to the controller 150. The controller 150 recognizes a position of the cathode electrode 22 (packed cathode electrode 20) on the cathode electrode supply table 121 based on the received image data. Since the cameras 127 receive lights that are emitted from the light sources 126 and then blocked by the cathode electrode 22 and transmitted by the separator 40, the controller 150 can recognize the position of the cathode electrode 22. Namely, the position of the cathode electrode 22 can be recognized based on a shadow of the cathode electrode 22. A horizontal position of the cathode electrode 22 (packed cathode electrode 20) is adjusted based on positional information of the cathode electrode 22 recognized by using the cameras 127. According to this adjustment, the first suction band 114 can precisely lift up the packed cathode electrode 20 of which the cathode electrode 22 has been precisely placed.

The anode electrode supply unit 130 supplies the anode electrodes 30. The anode electrode supply unit 130 includes an anode electrode supply table 131 on which the anode electrode 30 is laid, and a table drive-unit 132 for horizontally shifting or rotating the anode electrode supply table 131. The anode electrode 30 that has been made in a previous process and then fed by a suction conveyor 133 is laid on the anode electrode supply table 131 sheet by sheet. The anode electrode supply table 131 is also a suction conveyor. The anode electrode supply table 131 suctions the anode electrode 30 after suctioning by the suction conveyor 133 is stopped, and then conveys the anode electrode 30 almost as it is to its center to hold it by negative pressure. In addition, suctioning of the anode electrode supply table 131 is made stopped when the anode electrode 30 is suctioned by the second suction hand 115. The table drive unit 132 horizontally shifts or rotates the anode electrode supply table 131 to change a position of the anode electrode 30 on the anode electrode supply table 131. The table drive unit 132 has three motors for horizontally shifting or rotating the anode electrode supply table 131 (one motor for rotating, and two motors for horizontally shifting along two directions intersecting perpendicularly to each another: see arrows on the cathode electrode supply table 131 shown in FIG. 4).

In addition, as shown in FIG. 4, a light source 136 and a camera 137 are provided above the anode electrode supply table 131. The light source 136 emits light of wavelength that cannot be transmitted through the anode electrode 30 (reflected or absorbed). The camera 137 takes images of the anode electrode 30 from above and then outputs image data to the controller 150. The controller 150 recognizes a position of the anode electrode 30 on the anode electrode supply table 131 based on the received image data. Since the camera 137 receives light that is emitted from the light source 136 and then reflected by the anode electrode 30 for example, the controller 150 can recognize the position of the anode electrode 30. A horizontal position of the anode electrode 30 is adjusted based on positional information of the anode electrode 30 recognized by using the camera 137. According to this adjustment, the second suction hand 115 can precisely lift up the anode electrode 30 that has been precisely placed.

The laminating unit 140 is a place where the packed cathode electrodes 20 and the anode electrodes 30 carried by the lamination robot 110 are laminated alternately. The assembled laminate 15 composed of the packed cathode electrodes 20 and the anode electrodes 30 is laid on the laminating unit 140 until the predetermined number of sheets of the packed cathode electrodes 20 and the anode electrodes 30 are laminated. The assembled laminate 15 is completed as the power-generation element 15 when the predetermined number of sheets of the packed cathode electrodes 20 and the anode electrodes 30 have been laminated, and thereby the laminating unit 140 supplies the power-generation element 15 to a following process.

Figure 7:
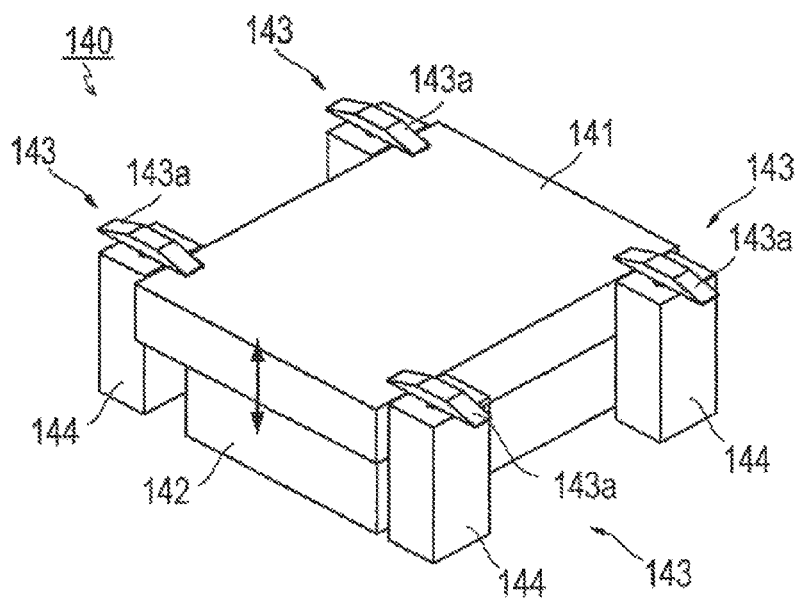
FIG. 7 (A) is a perspective view (when clampers are lifted up) of a laminating area in the sheet lamination apparatus, and (B) is a perspective view (when clampers are moved, downward) of the same.
Figure 7:
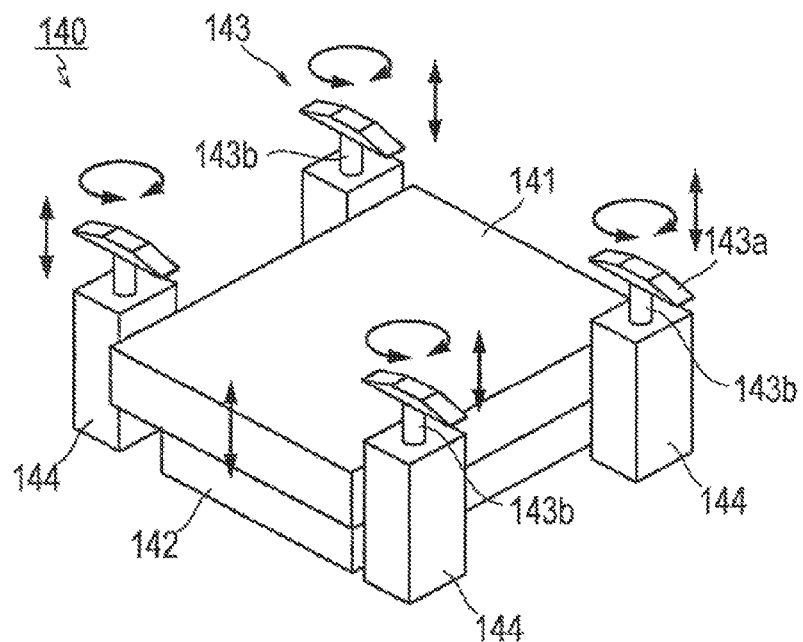

As shown in FIG. 7(A) and FIG. 7(B), the laminating unit 140 includes a lamination table 141 on which the packed cathode electrodes 20 and the anode electrodes 30 are laminated alternately, a level adjuster (level adjusting means) 142 that vertically moves the lamination table 141, clampers 143 that press the assembled laminate 15 composed of the packed cathode electrodes 20 and the anode electrodes 30, and clamper drive units (drive means for the holding means) 144 that drive the clampers 143.

A palette (not shown) is laid on the lamination table 141, and the packed cathode electrodes 20 and the anode electrodes 30 are laminated on the palette alternately. The level adjuster 142 is configured by a ball screw and a motor, for example, and moves the lamination table 141 downward according to a lamination progress of the packed cathode electrodes 20 and the anode electrodes 30. The level adjuster 142 moves the lamination table 141 so as to keep a height level of an uppermost surface of the assembled laminate 15 composed of the packed cathode electrodes 20 and the anode electrodes 30 at a substantially constant level.

Each of the clampers 143 is configured by a clamp head 143a that presses the assembled laminate 15 composed of the packed cathode electrodes 20 and the anode electrodes 30 from above, and a support rod 143b that supports the clamp head 143a. The clamp head 143a has a trapezoidal side faces. The clamp head 143a is biased downward via the support rod 143b, and the uppermost surface of the assembled laminate 15 is pressed by a bottom face of the clamp head 143a.

The clamper drive unit 144 lifts up the clamp head 143a to the constant height level via the support rod 143b while rotating it. Subsequently, the clamper drive unit 144 rotates the clamp head 143a by 180 degrees and then moves it downward. The clamper drive unit 144 includes a cam mechanism (not shown) that is composed of a cam slot that is coupled with a cam pin (not shown) projected from a side face of the support rod 143b to rotate the clamp head 143a and lift up it to the constant height level, and an actuator for moving the support rod 143b vertically. The actuator is an air cylinder, for example. When moving the support rod 143b vertically by the actuator, the clamp head 143a (and the support rod 143b) is rotated by the cam mechanism. In addition, since the lifted-up uppermost position of the clamp head 143a is restricted by the cam mechanism, the clamp head 143a is never lifted up to a level higher than the above-explained constant height level. Further, a spring (not shown) for biasing the clamp head 143a downward is also provided in the clamper drive unit 144.

In the sheet lamination apparatus 100 configured as explained above, the packed cathode electrode(s) 20 laid on the cathode electrode supply table 121 and the anode electrode(s) 30 laid on the anode electrode supply table 131 are alternately lifted up by the lamination robot 110, and then alternately carried onto the lamination table 141. By alternately carrying the packed cathode electrode(s) 20 and the anode electrode(s) 30 onto the lamination table 141, the assembled laminate 15 composed of the packed cathode electrodes 20 and the anode electrodes 30 is formed.

Note that, in the present embodiment, the first arm 111 and the second arm 112 are extended along directions that form a 90-degree angle therebetween, and the arm unit 113 is configured to swing 90 degrees. However, the first arm 111 and the second arm 112 may be extended along directions that form an angle therebetween other than a 90-degree, and, in this case, the arm unit 113 may swing an arbitrary angle. Arrangements of the cathode electrode supply unit 120, the anode electrode supply unit 130 and the laminating unit 140 may be also adjusted according to the swing angle.

Next, operations of the sheet lamination apparatus 100 will be explained with reference to FIG. 8 to FIG. 19.

First, operations of the lamination robot 110 will be explained with reference to FIG. 8 to FIG. 13. Here, the operations will be explained from a process in which the packed cathode electrode 20 is laminated by the lamination robot 110.

Figure 8:
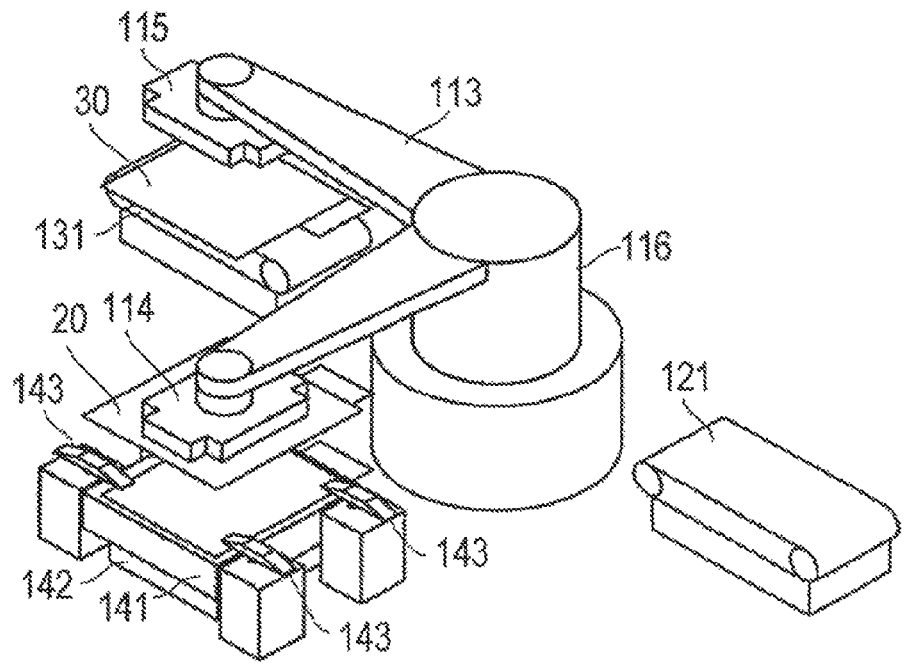
FIG. 8 It is a perspective view of a lamination robot in the sheet lamination apparatus (operation 1), FIG. 9 It is a perspective view of the lamination robot (operation 2), FIG. 10 It is a perspective view of the lamination robot (operation 3), FIG. 11 ft is a perspective view of the lamination robot (operation 4), FIG. 12 It is a perspective view of the lamination robot (operation 5).

First, the first suction hand 114 suctions the packed cathode electrode 20 to hold it, and is located over the lamination table 141, as shown in FIG. 8. On the other hand, the second suction hand 115 is located over the anode electrode supply table 131. The assembled laminate 15 composed of the packed cathode electrodes 20 and the anode electrodes 30 is laid on the lamination table 141, and the anode electrode 30 is laid on the anode electrode supply table 132. A horizontal position of the anode electrode 30 on the anode electrode supply table 131 has been adjusted based on its positional information obtained, by the camera 137 so that the second suction hand 115 can suction the anode electrode 30 precisely. Specifically, the center of the anode electrode 30 is placed at a predetermined point, and the anode electrode 30 is oriented so as to be located at a predetermined horizontal position.

Figure 9:
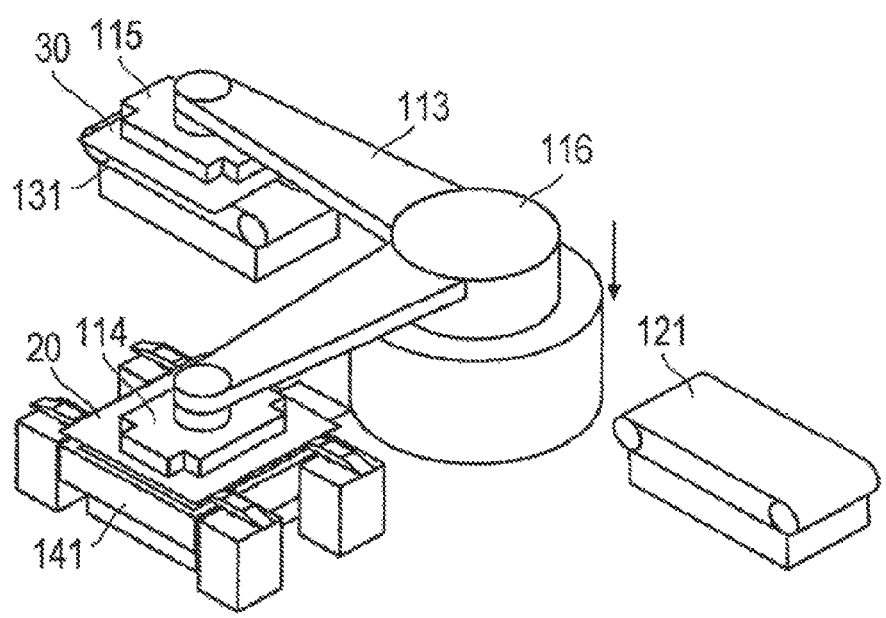

Subsequently, the arm unit 113 is moved downward by a predetermined stroke length (see FIG. 9). By downward moving of the arm unit 113, the first suction, hand 114 is moved closer to the lamination table 141, and the second suction hand 115 is moved closer to the anode electrode supply table 131. Then, suctioning of the first suction hand 114 is stopped to release the packed cathode electrode 20. As a result, the packed cathode electrode 20 is laid on the uppermost of the assembled laminate 15. On the other hand, suctioning of the second suction hand 115 is started, and thereby the anode electrode 30 laid on the anode electrode supply table 131 is suctioned to be held. Since the horizontal position of the anode electrode 30 is preliminarily adjusted, the second suction hand 115 can suction the anode electrode 30 to hold it precisely.

Figure 10:
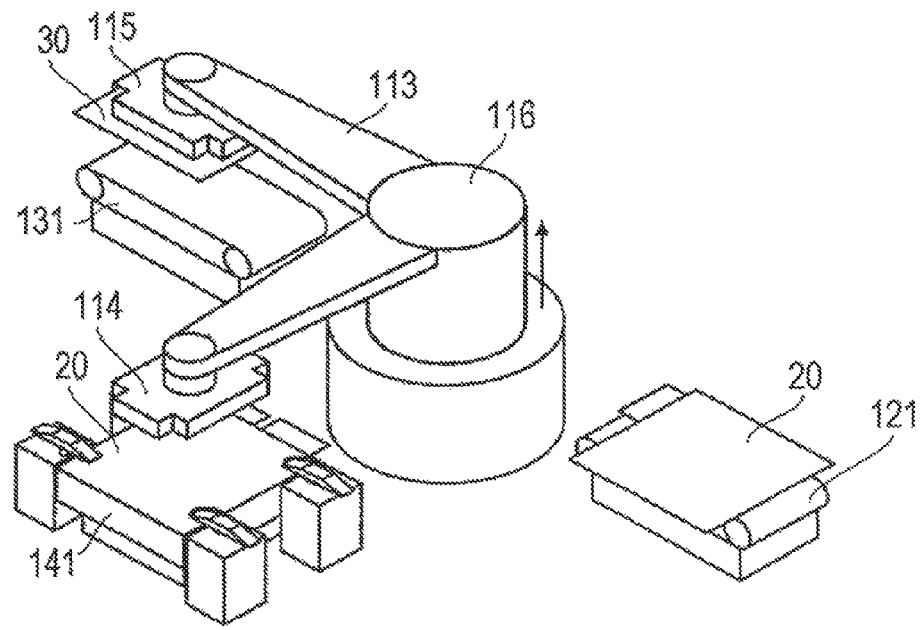

Subsequently, the arm unit 113 is moved upward by the above-explained stroke length, (see FIG. 10). By upward moving of the arm unit 113, the first suction hand 114 is moved to a position over the lamination table 141, and the second suction hand 115 is moved to a position, over the anode electrode supply table 131. At this time, the second suction hand 115 lifts up the anode electrode 30 while suctioning the anode electrode 30 to hold it.

Figure 11:
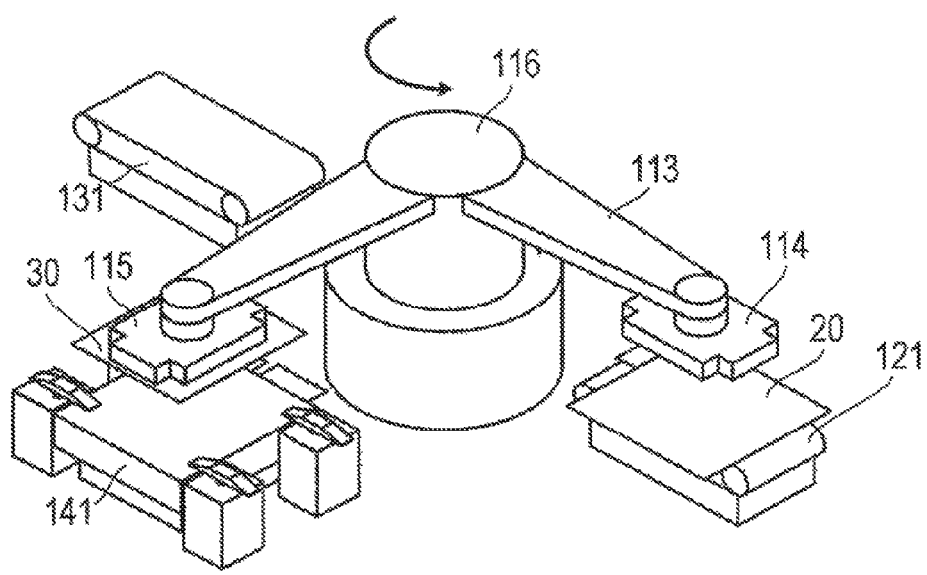

Subsequently, the arm unit 113 is rotated by 90 degrees anticlockwise (see FIG. 11). By 90-degree rotating of the arm unit 113, the first suction hand 114 is moved to a position over the cathode electrode supply table 121, and the second suction hand 115 is moved to a position over the lamination table 141. The packed cathode electrode 20 is laid on the cathode electrode supply table 121, and the horizontal position of the packed cathode electrode 20 on the cathode electrode supply table 121 is preliminarily adjusted based on its positional information obtained by the cameras 127 so that the first suction hand 114 can suction the packed cathode electrode 20 precisely. Specifically, the center of the packed cathode electrode 20 is placed at a predetermined point, and the packed cathode electrode 20 is oriented so as to be located at a predetermined horizontal position.

Figure 12:
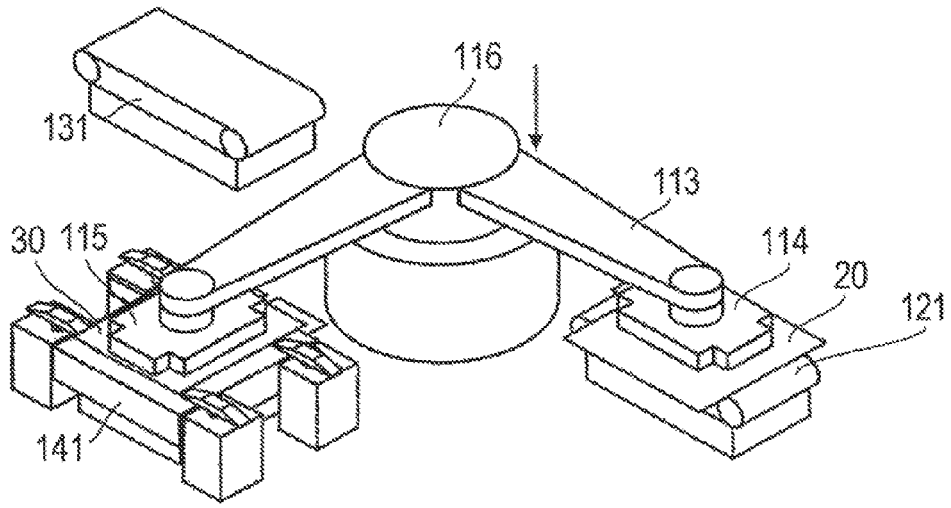

Subsequently, the arm unit 113 is moved downward by the above-explained predetermined stroke length (see FIG. 12). By downward moving of the arm unit 113, the first suction hand 114 is moved closer to the cathode electrode supply table 121, and the second suction hand 115 is moved closer to the lamination table 141. Then, suctioning of the second suction hand 115 is stopped to release the anode electrode 30. As a result, the anode electrode 30 is laid on the uppermost of the assembled laminate 15. On the other hand, suctioning of the first suction hand 114 is started, and thereby the packed cathode electrode 20 laid on the cathode electrode supply table 121 is suctioned to be held. Since the horizontal position of the packed cathode electrode 20 is preliminarily adjusted, the first suction hand 114 can suction the packed cathode electrode 20 (cathode electrode 22) to hold it precisely.

Figure 13:
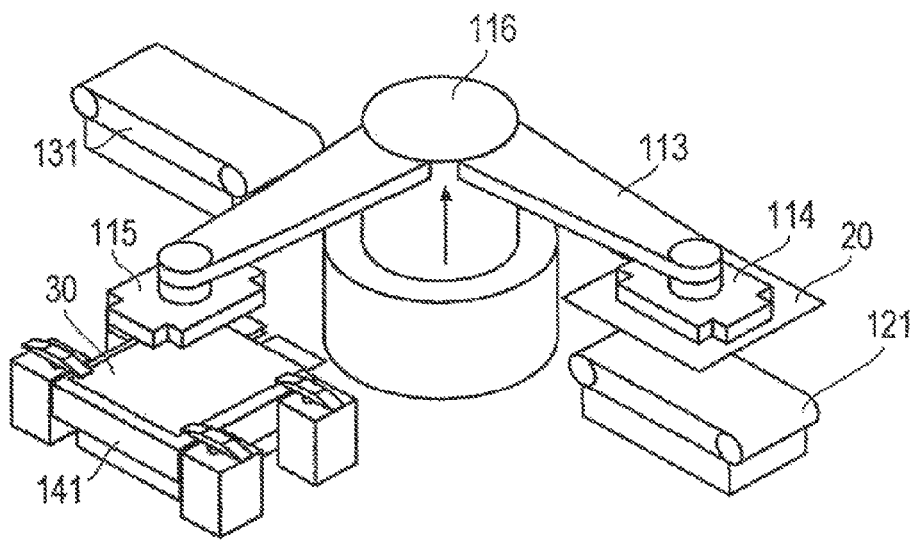
FIG. 13 It is a perspective view of the lamination robot (operation 6).

Subsequently, the arm unit 113 is moved upward by the above-explained stroke length (see FIG. 13). By upward moving of the arm unit 113, the first suction hand 114 is moved to a position over the cathode electrode supply table 121, and the second suction hand 115 is moved to a position over the lamination table 141. At this time, the first suction hand 114 lifts Bp the packed cathode electrode 20 while suctioning the packed cathode electrode 20 to hold it.

Subsequently, the arm unit 113 is rotated by 90 degrees clockwise. By 90-degree rotating of the arm unit 113, the first suction hand 114 is moved to a position over the lamination table 141, and the second suction hand 115 is moved to a position, over the anode electrode supply table 131 (see FIG. 8).

By repeating the above-explained operations shown in FIG. 8 to FIG. 13, the packed cathode electrodes 20 and the anode electrodes 30 are alternately carried onto the lamination table 141, and alternately laminated on the lamination table 141. The assembled laminate 15 is completed as the power-generation element 15 when the predetermined number of sheets of the packed cathode electrodes 20 and the anode electrodes 30 have been laminated.

At this time, the first suction hand 114 precisely lifts up the packed cathode electrode 20 from the cathode electrode supply table 121 and the second suction hand 115 precisely lifts up the anode electrode 30 from the anode electrode supply table 131, and then the packed cathode electrode 20 and the anode electrode 30 are released, at a target position on the lamination table 141. According to these configurations, it is possible to laminate the packed cathode electrode 20 and the anode electrode 30 on the lamination table 141 with high accuracy by consistent swing operations of the arm unit 113. Namely, it is possible to laminate the packed cathode electrode 20 and the anode electrode 30 on the lamination table 141 with high accuracy by the simply-configured lamination robot 110. In addition, it is not needed to provide an adjustment mechanism for the horizontal position of the packed cathode electrode 20 and the anode electrode 30 at each end of the first arm 111 and the second arm 112, so that weights of the first arm 111 and the second arm. 112 can be reduced. Due to the reduction of the weights of the first arm 111 and the second arm 112, the first arm 111 and the second arm 112 can be moved at high speed. Therefore, it becomes possible to laminate the packed cathode electrodes 20 and the anode electrodes 30 at high speed.

Next, operations of the laminating unit 140 will be explained with reference to FIG. 14 to FIG. 19. At the laminating unit 140, the lamination table 141 is moved downward once for every new lamination of the packed cathode electrode 20 or the anode electrode 30 on the lamination table 141 to keep the uppermost surface of the assembled laminate 15 composed of the packed cathode electrodes 20 and the anode electrodes 30 at the substantially constant height level. Operations of the laminating unit 140 for laminating the packed cathode electrode 20 on the lamination table 141 will be explained below, as an example, but they are much the same for laminating the anode electrode 30.

Figure 14:
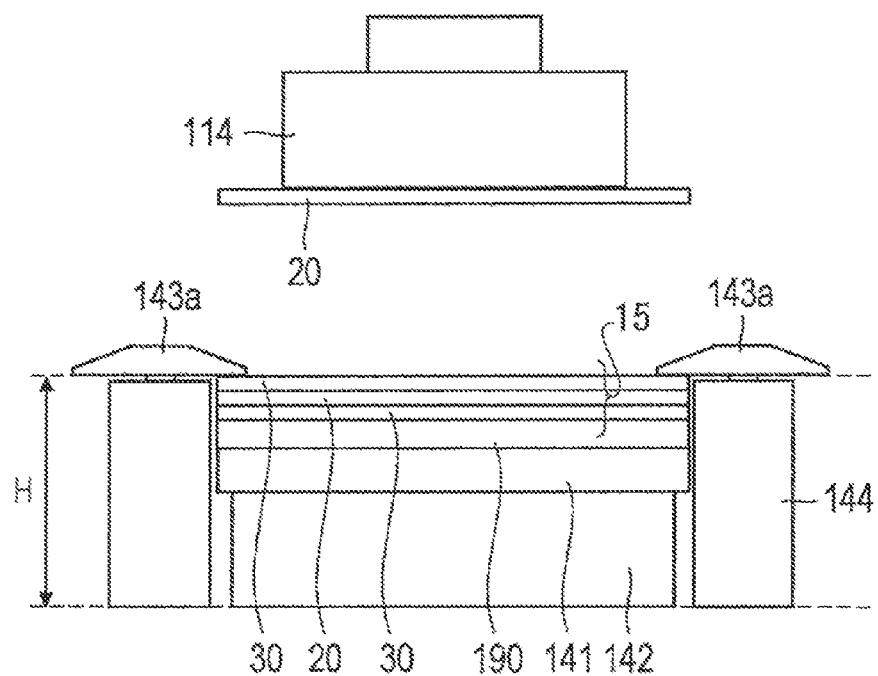
FIG. 14 It is a front view of a laminating area in the lamination apparatus (operation a).

As shown in FIG. 14, the packed cathode electrodes 20 and the anode electrodes 30 are alternately laminated on the lamination table 141 with the palette 190 interposed (the assembled laminate 15). The anode electrode 30 is laminated at the uppermost of the assembled laminate 15, and both edges of the anode electrode 30 are pressed downward by each one end of the clamp heads 143a. The first suction hand 114 is located over the lamination table 141, and the first suction hand 114 suctions the packed cathode electrode 20 to hold it.

Figure 15:
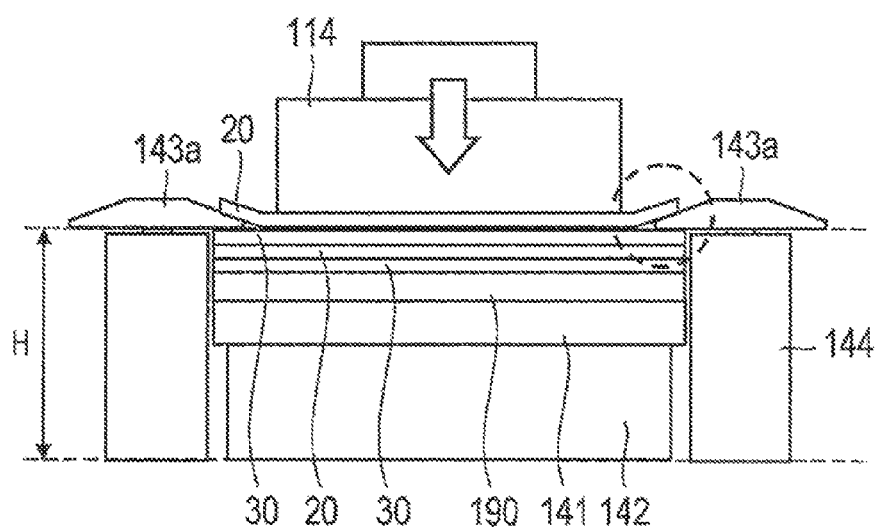
FIG. 15 It is a front view of the laminating area (operation b).

Subsequently, the first suction hand 114 is moved downward, closer to the lamination table 141 (see FIG. 15). The first suction hand 114 is moved downward by the above-explained predetermined stroke length. By downward moving of the first suction hand 114, the packed cathode electrode 20 is laminated on the uppermost of the assembled laminate 15. At this time, the clamp heads 143a are covered by both edges of the packed cathode electrode 20 (see a portion, in a dotted circle shown in FIG. 15).

Figure 16:
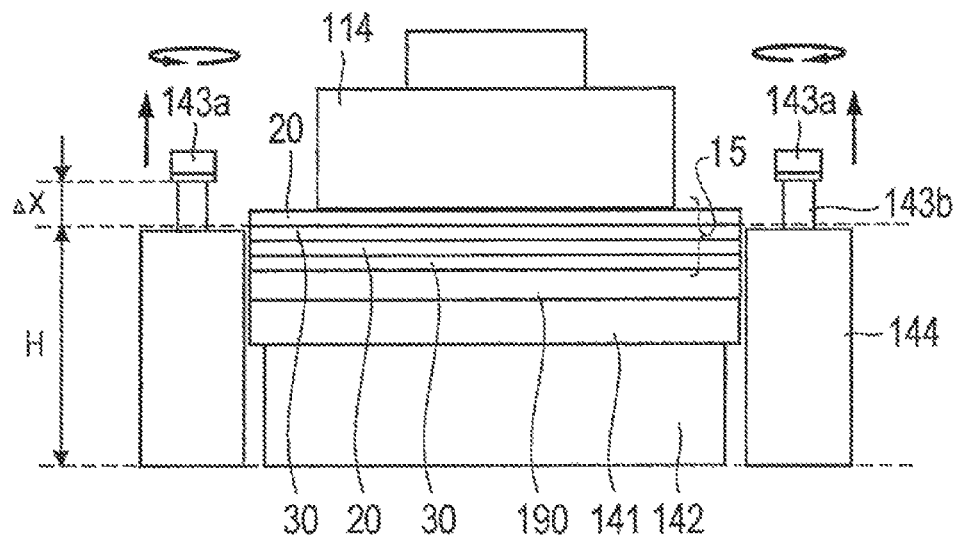
FIG. 16 It is a front view of the laminating area (operation c)

Subsequently, the clamp heads 143a are lifted up while being rotated by 90 degrees (see FIG. 16). Specifically, the clamp heads 143a covered by the both edges of the pocked cathode electrode 20 are lifted up while being rotated by 90 degrees. By lifting-up and 90-degree rotation of the clamp heads 143a, the clamp heads 143a are located obliquely above the uppermost packed cathode electrode 20 in the assembled laminate 15. Here, an upward stroke ΔX is a substantially constant value larger than thickness of a single sheet of the packed cathode electrode 20. While the clamp heads 143a are lifted up, the both edges of the packed cathode electrode 20 are moved upward by the clamp heads 143a to be curled up temporally and then restitute.

Figure 17:
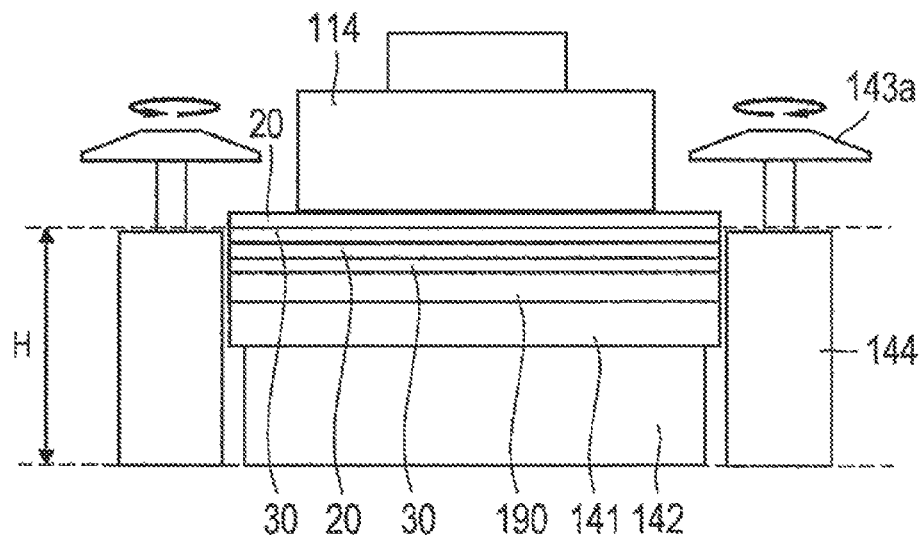
FIG. 17 It is a front view of fee laminating area (operation d).

Subsequently, the clamp heads 143a are further rotated by 90 degrees (see FIG. 17). Specifically, the clamp heads 143a are rotated by 90 degrees while being lifted up further by another predetermined stroke length. By further 90-degree rotation, of the clamp heads 143a, each another end of the clamp heads 143a is located above the packed cathode electrode 20. Note that operations shown in FIG. 16 to FIG. 17, i.e. the 90-degree rotation and the further 90-degree rotation of the clamp heads 143a are done continuously.

Figure 18:
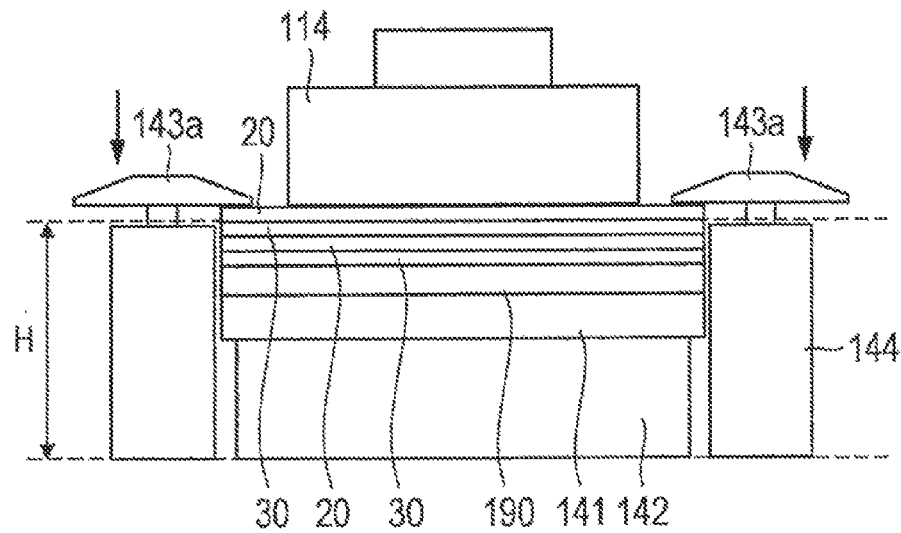
FIG. 18 It is a front view of the laminating area (operation e).

Subsequently, the clamp heads 143a are moved downward (see FIG. 18). By downward moving of the clamp heads 143a, a bottom face of each the other end of the clamp heads 143a presses the both edges of the packed cathode electrode 20 from above.

Figure 19:
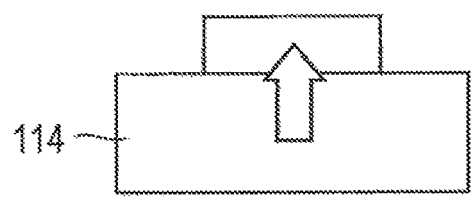
FIG. 19 It is a front view of the laminating area (operation f).
Figure 19:
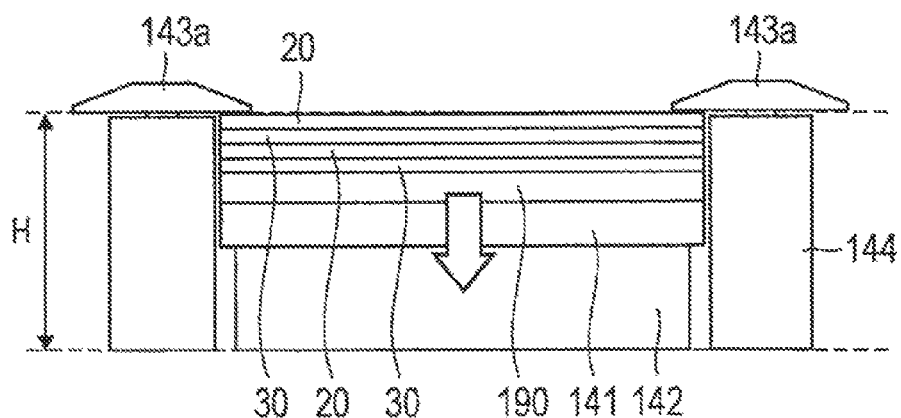

Subsequently, the first suction hand 114 is moved upward by the above-explained predetermined stroke length, and the lamination table 141 is moved downward by a predetermined downward stroke length (see FIG. 19). Specifically, the lamination table 141 is moved downward so that a height level of the uppermost surface of the assembled laminate 15 after the lamination of the packed cathode electrode 20 becomes substantially identical to a height level H of the uppermost surface of the assembled laminate 15 before the lamination of the packed cathode electrode 20. This downward stroke length is an average value of thickness of the packed cathode electrode 20 and the anode electrode 30, for example. Note that the both edges of the uppermost surface of the assembled laminate 15 are pressed, downward by the clamp heads 143a while the lamination table 141 is moved downward.

As explained above, the clamp heads 143a are temporally evacuated obliquely above when a new packed cathode electrode 20 (or a new anode electrode 30) is laminated on the assembled laminate 15 pressed by the clamp heads 143a, and then press the new packed cathode electrode 20 downward. At this time, the lamination table 141 is moved downward by the predetermined downward stroke length so as to keep the height level of the uppermost surface of the assembled laminate 15 substantially constant. If the height level of the uppermost surface of the assembled laminate 15 is kept substantially constant, an upward stroke length for rotating and lifting-up of the clamp heads 143a can be kept at a substantially constant value smaller than final thickness of the assembled laminate 15 (thickness of the power-generation, element 15) even when thickness of the assembled laminate 15 increases along with the lamination progress of the packed cathode electrodes 20 and the anode electrodes 30. Namely, the upward stroke length of the clamp heads 143a can be kept at a constant amount corresponding to thickness of few sheets of the packed cathode electrodes 20 (the anode electrodes 30) from start to end of the lamination process. Therefore, deformation of the edges of the packed cathode electrode 20 or the anode electrode 30 by being curled op along with upward moving by the clampers 143 can be restricted in comparison with a case where the upward stroke length of the clamper 143 is larger than the final thickness of the assembled laminate 15. In other words, the smaller the upward stroke length for rotating and moving-upward of the clampers 143 becomes, the smaller the curl-up deformation of the edges of the packed cathode electrode 20 or the anode electrode 30 becomes (the edges can be released from the clampers 143 with the small end-up deformation). Therefore, it is possible to laminate the packed cathode electrodes 20 and the anode electrodes 30 without making the packed cathode electrodes 20 and the anode electrodes 30 extremely deformed.

Note that it may be obviously possible to control the lamination table 141 so as to keep the uppermost surface of the assembled laminate 15 at a constant height level consistently. Since the lamination position for the packed cathode electrode 20 or the anode electrode 30 to be laminated (the uppermost surface of the assembled laminate 15) is precisely fixed when the uppermost surface of the assembled, laminate 15 is consistently kept at the constant height level, it is possible to laminate the packed cathode electrodes 20 or the anode electrodes 30 with high accuracy.

Note that, in the present embodiment, when a new packed cathode electrode 20 is laminated, the clamp heads 143a are lifted up by the substantially constant stroke length larger than thickness of a single sheet of the packed cathode electrode 20 and rotated to be evacuated obliquely above the assembled laminate 15 once, and then moved downward to press the uppermost surface of the assembled laminate 15 downward. However, it is possible that the clamp heads 143a are lifted up by a stroke identical to thickness of a single sheet of the packed cathode electrode 20 and rotated to be evacuated, obliquely above the assembled laminate 15 once, and then rotated to press the uppermost surface of the assembled laminate 15 without being moved downward.

In addition, since the uppermost surface of the assembled laminate 15 is kept at the substantially constant height level by the laminating unit 140 during the repeated laminations of the packed cathode electrodes 20 and the anode electrodes 30 in the present embodiment, a vertical stroke length of the first suction hand 114 and the second suction hand 115 can be made constant. Namely, it is possible to laminate the packed cathode electrodes 20 and the anode electrodes 30 on the lamination table 141 by the simply-configured lamination robot 110. In addition, it is not needed to provide a compensation mechanism for a vertical position of the first suction hand 114 and the second suction hand 115 at each end of the first arm 111 and the second arm 112, so that weights of the first arm 111 and the second arm 112 can be reduced. Due to the reduction of the weights of the first arm 111 and the second arm 112, the first arm 111 and the second arm 112 can be moved at high speed. Therefore, it becomes possible to laminate the packed cathode electrodes 20 and the anode electrodes 30 at high speed, Note that, in the present embodiment, the lamination table 141 is moved downward by the predetermined downward stroke length corresponding to the average value of thicknesses of the packed cathode electrode 20 and the anode electrode 30 for every new lamination of the packed cathode electrode 20 or the anode electrode 30 on the assembled laminate 15. However, it is possible to move the lamination, table 141 downward, for every new lamination of the packed cathode electrode 20 or the anode electrode 30, by a downward stroke length identical to thickness of the packed cathode electrode 20 or the anode electrode 30 that is newly laminated. Alternatively, it is possible to move the lamination table 141 downward for every lamination of the predetermined number of sheets of the packed cathode electrodes 20 and the anode electrodes 30 (e.g. two for each).

Note that, in the present embodiment, the explanation that the upward stroke length (displacement) of the clamp heads is "substantially constant" includes not only a ease where the upward stroke length of the clamp heads 143a is kept constant consistently but also a case where the upward stroke length slightly fluctuates. For example, in a case where the lamination table 141 is moved downward by the displacement identical to thickness of the packed cathode electrode 20 (or the anode electrode 30) that is newly laminated for every new lamination of the packed cathode electrode 20 (or the anode electrode 30), the upward stroke amount of the clamp heads 143a is kept constant consistently. On the other hand, in a case where the lamination table 141 is moved downward by the downward stroke length corresponding to the average value of thickness of the packed cathode electrode 20 and the anode electrode 30, the upward stroke amount of the clamp heads 143a fluctuates by a difference between the average value and the thickness of the packed cathode electrode 20 or a difference between the average value and the thickness of the anode electrode 30. In this DESCRIPTION, the explanation that the upward stroke length of the clamp heads is "substantially constant" includes a ease where the upward stroke length of the clamp heads 143a slightly fluctuates according to downward moving of the lamination table 141, as explained above.

Next, a modified example of the clamper will be explained with reference to FIG. 20(A) and FIG. 20(B).

Figure 20:
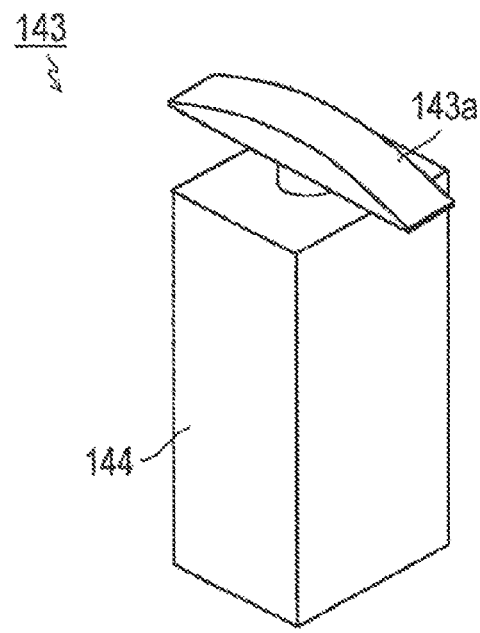
FIG. 20 (A) is a perspective view showing a modified example of the clamper (when moved downward), and (B) is a perspective view of the same (when lifted, up)
Figure 20:
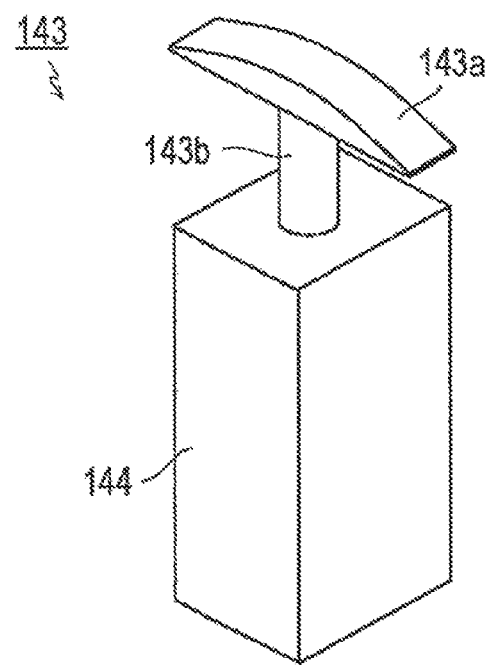

As shown in FIG. 20(A) and FIG. 20(B), the clamp head 143a of the clamper 143 according to the modified example has a curved side face. Specifically, an upper surface of the clamp head 143a to be contacted with a lower face of the packed cathode electrode 20 or the anode electrode 30 that is newly laminated is formed as a smoothly curved surface curving along its longitudinal direction.

According to the above configuration, the lower face of the packed cathode electrode 20 or the anode electrode 30 smoothly contacts with an upper face of the clamp head 143a, so that damaged of the lower face of the packed cathode electrode 20 or the anode electrode 30 caused by the upper face of the clamp head 143a can be further restricted.

Note that it is preferable that the upper face of the clamp bead 143a is formed as a smoothly curved surface not only curving along the longitudinal direction but also curving along a direction perpendicular to the longitudinal direction.

According to the above-explained present embodiment, following advantages can be brought.

(a) Since the upward stroke length of the clampers to be evacuated obliquely above the packed cathode or the anode is smaller than the final thickness of the assembled laminate (thickness of the power-generation element), it is possible to laminate the packed cathodes and the anodes without making the packed cathodes and the anodes extremely deformed in comparison with a case where the upward stroke length is larger than the final thickness of the assembled laminate.

(b) Since the displacement of the clampers is substantially constant, affection, that the packed cathode and the anode receive also becomes constant and thereby it is possible to provide the power-generation elements with constant quality.

(c) Since the lamination table is moved downward by the level adjuster, it is not needed to adjust a height level of the clamper drive units and thereby configuration of the laminating unit can be simplified.

(d) Since the clamp head(s) has a curved, shape (the modified example shown in FIG. 20(A) and FIG. 20(B)), damages that the lower face of the packed cathode or the anode received from the clamper(s) can be further restricted.

The entire contents of a Japanese Patent Application No. 2011-85790 (filed Apr. 7, 2011) are incorporated herein by reference. Although the invention has been described above by reference to certain embodiments of the invention, the invention is not limited to the embodiments described above. Scope of the present invention is determined in the context of the claims.

For example, the packed cathode electrode 20 each of which is configured by sandwiching the cathode electrode 22 between two sheets of the separators 40 and the anode electrodes 30 are laminated alternately in the above embodiment. However, it is possible to laminate packed anodes each of which is configured by sandwiching an anode between two sheets of separators and cathodes alternately. Alternatively, it is possible to laminate a separator/cathode lamination sheet in which a separator is laminated on a cathode and a separator/anode lamination sheet in which a separator is laminated on an anode alternately.

The secondary battery cell formed by the above lamination apparatus is not limited to have a configuration in which, a cathode lead and an anode lead are extended out from an edge of an outer jacket, may have a configuration in which a cathode lead and an anode lead are extended cut from opposite both edges of an outer jacket, respectively.

The invention claimed is:

1. A lamination apparatus for laminating sheet members including an electrode and a packed electrode formed by sandwiching another electrode with different polarity from polarity of the electrode between two separators, the apparatus comprising:
   a table on which the sheet members are laminated;
   a hand that is moved downward from a position above the table to laminate the sheet members on the table;
   a clamper that presses an assembled laminate of the sheet members laminated on the table, a clamper drive unit that horizontally rotates and vertically moves the clamper; and a level adjuster that moves the table downward relative to the clamper according to a lamination progress of the sheet members, wherein, when a new sheet member is laminated on the assembled laminate that is pressed downward by the clamper, the clamper drive unit lifts up the clamper above the new sheet member while rotating the clamper and then moves the clamper downward to press the new sheet member from above, and the level adjuster moves the table downward by a stroke length corresponding to thickness of the new sheet member so that an uppermost surface of the assembled laminate is kept at a constant height level.

2. The lamination apparatus according to claim 1, wherein the clamper drive unit vertically moves the clamper by a substantially constant vertical displacement.

3. The lamination apparatus according to claim 1, wherein the level adjuster moves the table itself downward to move the table downward relative to the clamper.

4. The lamination apparatus according to claim 1, further comprising:

an upper surface of the clamper is formed as a smoothly curved surface.

5. A lamination apparatus for laminating sheet members including an electrode and a packed electrode formed by sandwiching another electrode with different polarity from polarity of the electrode between two separators, the apparatus comprising:

a table on which the sheet members are laminated;

a hand that is moved downward from a position above the table to laminate the sheet members on the table;

a holding means that presses an assembled laminate of the sheet members laminated on the table;

a drive means for the holding means that horizontally rotates and vertically moves the holding means; and a level adjusting means that moves the table downward relative to the holding means according to a lamination progress of the sheet members, wherein, when a new sheet member is laminated on the assembled laminate that is pressed downward by the holding means, the drive means for the holding means lifts up the holding means above the new sheet member while rotating the holding means and then moves the holding means downward to press the new sheet member from above, and the level adjusting means moves the table downward by a stroke length corresponding to thickness of the new sheet member so that an uppermost surface of the assembled laminate is kept at a constant height level.

6. A lamination method for laminating sheet members including an electrode and a packed electrode formed by sandwiching another electrode with different polarity from polarity of the electrode between two separators, the method comprising:

laminating a new sheet member on an assembled laminate of the sheet members that are laminated on a table by a hand that is moved downward from a position above the table to laminate the sheet members on the table and pressed by a clamper from above, pressing the new sheet member from above by lifting up the clamper above the new sheet member while rotating the clamper and then moving the clamper downward, and moving the table downward relative to the clamper by a stroke length corresponding to thickness of the new sheet member so that an uppermost surface of the assembled laminate is kept at a constant height level.

7. The lamination method according to claim 1, wherein the clamper is vertically moved by a substantially constant vertical displacement.

8. The lamination method according to claim 6, wherein the table itself is moved downward so that the table is moved downward relative to the clamper.

9. The lamination method according to claim 6, wherein an upper surface of the clamper is formed as a smoothly curved surface.

* * * * *